(12) United States Patent
Nishiyama et al.

(10) Patent No.: US 11,704,697 B2
(45) Date of Patent: Jul. 18, 2023

(54) ON-BOARD SIGNAGE SYSTEM

(71) Applicant: Toyota Jidosha Kabushiki Kaisha, Toyota (JP)

(72) Inventors: Masahiro Nishiyama, Toyota (JP); Kenji Tsukagishi, Toyota (JP); Takahisa Kaneko, Toyota (JP); Erina Kigoshi, Tokyo-to (JP); Aiko Miyamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 17/213,893

(22) Filed: Mar. 26, 2021

(65) Prior Publication Data

US 2021/0304255 A1     Sep. 30, 2021

(30) Foreign Application Priority Data

Mar. 27, 2020   (JP) .................................. 2020-057370

(51) Int. Cl.

| | |
|---|---|
| *G06Q 30/02* | (2023.01) |
| *G06Q 30/0251* | (2023.01) |
| *G06Q 50/00* | (2012.01) |
| *B60Q 1/50* | (2006.01) |
| *G09F 9/30* | (2006.01) |
| *G09F 21/04* | (2006.01) |
| *G06Q 30/0214* | (2023.01) |
| *H04W 4/44* | (2018.01) |

(52) U.S. Cl.
CPC ......... *G06Q 30/0266* (2013.01); *B60Q 1/503* (2013.01); *G06Q 50/01* (2013.01); *G09F 9/30* (2013.01); *G09F 21/04* (2013.01); *G06Q 30/0214* (2013.01); *H04W 4/44* (2018.02)

(58) Field of Classification Search
CPC ........ G06Q 30/0266; G09F 9/30; B60Q 1/503
See application file for complete search history.

(56) References Cited

U.S. PATENT DOCUMENTS

| | | | |
|---|---|---|---|
| 10,665,155 B1 * | 5/2020 | Rao .................... | G06Q 30/0242 |
| 2006/0059745 A1 * | 3/2006 | Maqui .................... | G09F 21/02 |
| | | | 40/591 |

(Continued)

FOREIGN PATENT DOCUMENTS

| | | |
|---|---|---|
| JP | 2010-237411 A | 10/2010 |
| JP | 2013-148949 A | 8/2013 |

(Continued)

*Primary Examiner* — Scott C Anderson
(74) *Attorney, Agent, or Firm* — Dinsmore & Shohl LLP

(57) ABSTRACT

An on-board signage system includes one or more vehicles, a display device installed in each of the vehicles, and a signage controller, in which the signage controller is configured to function as a post collecting unit that collects a post content item uploaded to an SNS site, a post analyzing unit which extracts a location relating to the post content item as a relevant location, a post database that stores post-related information obtained from the post content item in association with the relevant location, and a selector that selects at least one of a travel route of the vehicle and an image to be assigned to the vehicle, based on information stored in the post database, and transmits the selected travel route or image to the vehicle.

9 Claims, 10 Drawing Sheets

(56) References Cited

U.S. PATENT DOCUMENTS

| | | | |
|---|---|---|---|
| 2014/0278998 A1* | 9/2014 | Systrom | G06Q 30/0277 |
| | | | 705/14.57 |
| 2018/0124615 A1* | 5/2018 | Acosta | H04M 15/58 |
| 2018/0336592 A1* | 11/2018 | Kurra | G06Q 30/0261 |
| 2019/0041225 A1* | 2/2019 | Winkle | G01C 21/3453 |
| 2019/0197927 A1 | 6/2019 | Matsuoka et al. | |
| 2019/0215659 A1 | 7/2019 | Kusanagi et al. | |
| 2020/0223191 A1* | 7/2020 | Ladewski | G09F 19/18 |
| 2020/0412811 A1* | 12/2020 | Campbell | G05D 1/0221 |

FOREIGN PATENT DOCUMENTS

| | | |
|---|---|---|
| JP | 2017138243 A | 8/2017 |
| JP | 2019-117215 A | 7/2019 |
| JP | 2019120670 A | 7/2019 |

\* cited by examiner

| LOCATION | TIME | KEY WORD | CONTRIBUTOR'S ATTRIBUTE | POST'S ATTRIBUTE |
|---|---|---|---|---|
| LONGITUDE AND LATITUDE | 3/5 | *** | ... | ... |
| LONGITUDE AND LATITUDE | 3/5 | *** | ... | ... |
| LONGITUDE AND LATITUDE | 3/5 | *** | ... | ... |

FIG. 7

| ID | TARGET | TIME | REGION | PRIORITY | ACTUALLY DISPLAYED RECORD |
|---|---|---|---|---|---|
| 0001 | F20-40 |  | NATIONWIDE | ... | ... |
| 0002 | M20-60 | 17-24 | NATIONWIDE | ... | ... |
| 0003 | F15- | 11-22 | *** TOWN | ... | ... |

FIG. 8

ON-BOARD SIGNAGE SYSTEM

CROSS REFERENCE TO RELATED APPLICATION

This application claims priority to Japanese Patent Application No. 2020-057370 filed on Mar. 27, 2020, which is incorporated herein by reference in its entirety including the specification, claims, drawings, and abstract.

TECHNICAL FIELD

The present disclosure discloses an on-board signage system mounted on a vehicle and configured to display an image on a display viewable from outside the vehicle.

BACKGROUND

There have been conventionally known techniques for mounting a display on an outer surface of a vehicle and displaying images on the display in order to utilize the vehicle as movable digital signage. For example, JP 2019-117215 A discloses a technique for mounting a display on an exterior surface of a vehicle and displaying an advertising picture on the display.

In a part of this technical field, it has been suggested that post content uploaded to social network service (hereinafter referred to as "SNS") sites are used for advertising. For example, JP 2013-148949 A discloses a technique for collecting post content items uploaded to the SNS sites in association with locations, and selecting an advertising material to be displayed on a signage unit based on collected information.

However, in JP 2019-117215 A, a manner of selecting an image to be displayed is unknown. Consequently, the technique of the above patent document is not always able to display an image that matches people located close to the vehicle.

Meanwhile, the signage unit of JP 2013-148949 A is not mounted on a vehicle, which causes the signage unit to be at a substantially constant position. For this reason, in JP 2013-148949 A people who can view signage are limited to a certain extent. For example, when the signage unit is installed close to an entrance of a baseball stadium, viewers of signage are usually limited to baseball fans. As a result, the technique of JP 2013-148949 A cannot present a variety of advertising materials in an effective manner.

Given these circumstances, the present disclosure discloses an on-board signage system which can provide an improved advertising effect of an image.

In an aspect of the present disclosure, an on-board signage system includes at least one vehicle, a display device mounted on the at least one vehicle and configured to display an image assigned to the at least one vehicle on one or more display areas viewable from outside of the at least one vehicle, and a signage controller which is configured to function as a post collecting unit that collects a post content item posted to an SNS site, a post analyzing unit that analyzes the collected post content item to extract at least a location relating to the post content item as a relevant location, a post database that stores post-related information obtained from the post content item in connection with the extracted relevant location, an image database that stores a plurality of candidate images assignable to the at least one vehicle, and a selector that selects, based on information stored in the post database, at least one of a travel route of the at least one vehicle and an image assigned to the at least one vehicle and transmits the selected travel route or image to the at least one vehicle.

When configured as described above, because the travel route or image which produces a greater advertising effect can be selected, it can be ensured that the advertising effect is increased.

In the above-described configuration, the selector may include a route selecting unit configured to estimate a region which matches the image assigned to the vehicle or a region where there are a lot of people who match the image assigned to the vehicle, based on the information recorded in the post database, and to select the travel route of the vehicle based on the estimated region.

When configured as described above, because the vehicle can actively go to the region where there are a lot of people who are targeted for advertisement, the advertising effect can be further increased.

In the above-described configuration, the plurality of candidate images may include an advertising image, the selector may estimate, based on the information recorded in the post database, a region where there are a lot of people whose preferences match the advertising image assigned to the vehicle, and select the travel route of the vehicle based on the estimated region.

Because post content items posted to SNS sites tend to reflect preferences of contributors who have posted the items, the region where there are a lot of people whose preferences match the advertising image can be estimated from the post content items with a relatively high degree of accuracy. Then, in a case of the advertising image, a greater advertising effect can be obtained by placing a higher premium on the preferences of targeted people than on attributes of the targeted people. Therefore, with the above-described configuration, the advertising effect of the advertising image can be further increased.

In an aspect of the present disclosure, the plurality of candidate images may include an emergency image used for conveying emergency information which is information needed in the event of a disaster, and, in the event of a disaster, the selector may estimate, based on the information stored in the post database, a region where there are people who need to see the emergency image assigned to the vehicle, and select the travel route of the vehicle based on the estimated region.

The post content items posted to SNS sites are superior in rapidity and variety as compared with other media. For this reason, it can be ensured that information is reliably conveyed to people who need the information in the event of a disaster by estimating, based on the information stored in the post database in the event of a disaster, the region where the emergency image is needed.

In an aspect of the present disclosure, the selector may include an image selecting unit which is configured to estimate, based on the post-related information corresponding to a present or future vehicle location, a trend of people located in the vicinity of the vehicle location or a situation of a region in the vicinity of the vehicle location, and select an image to be assigned to the vehicle based on the estimated trend or situation.

When configured as described above, it becomes possible to show the image that matches the people located in the vicinity of the vehicle, which can help further increase the advertising effect.

In this case, the plurality of candidate images may include the advertising image, and the selector may estimate, based on the information recorded in the post database, the preferences of people located in the vicinity of the vehicle location, and select, based on the estimated preferences, the advertising image to be assigned to the vehicle.

When configured as described above, the advertising effect of the image can be further increased.

In an aspect of the present disclosure, the plurality of candidate images may include the emergency image used for conveying emergency information which is information needed in the event of a disaster, and in the event of a disaster, the selector may estimate, based on the information stored in the post database, a disaster situation of the region in the vicinity of the vehicle location or a situation of damage to people located in the vicinity of the vehicle location, and select the emergency image to be assigned to the vehicle, based on the estimated situation.

When configured as described above, it can be ensured in the event of a disaster that information is reliably conveyed to people who need the information.

In an aspect of the present disclosure, the signage controller may be further configured to function as an image generating unit that generates the emergency image used for conveying the emergency information which is information in the event of a disaster, based on the post-related information which is collected when and after the disaster occurs, and records the generated emergency image in the image database.

When the emergency image is generated based on the post content items posted to the SNS sites which are superior in rapidity, information useful in the event of a disaster can be promptly supplied to people.

In an aspect of the present disclosure, the signage controller may be further configured to function as a bonus offering unit that offers a bonus to a registered user, and the post analyzing unit may be further configured to analyze the collected post content items to extract a post content item relating to the image displayed on the vehicle as a responded post content item, while the bonus offering unit may offer the bonus to at least one of a contributor who has posted the responded post content item and an owner of the vehicle displaying the image which is noted in the responded post content item.

When configured as described above, the image displayed on the vehicle is actively posted to the SNS sites, which can help further increase the advertising effect of the image.

The on-board signage system disclosed herein can ensure that the advertising effect of the image is increased.

BRIEF DESCRIPTION OF DRAWINGS

Embodiments of the present disclosure will be described based on the following figures, wherein:

FIG. 7 shows an example of data items stored in a post database;

FIG. 8 shows an example of data items stored in an image database;

DESCRIPTION OF EMBODIMENTS

Figure 1:
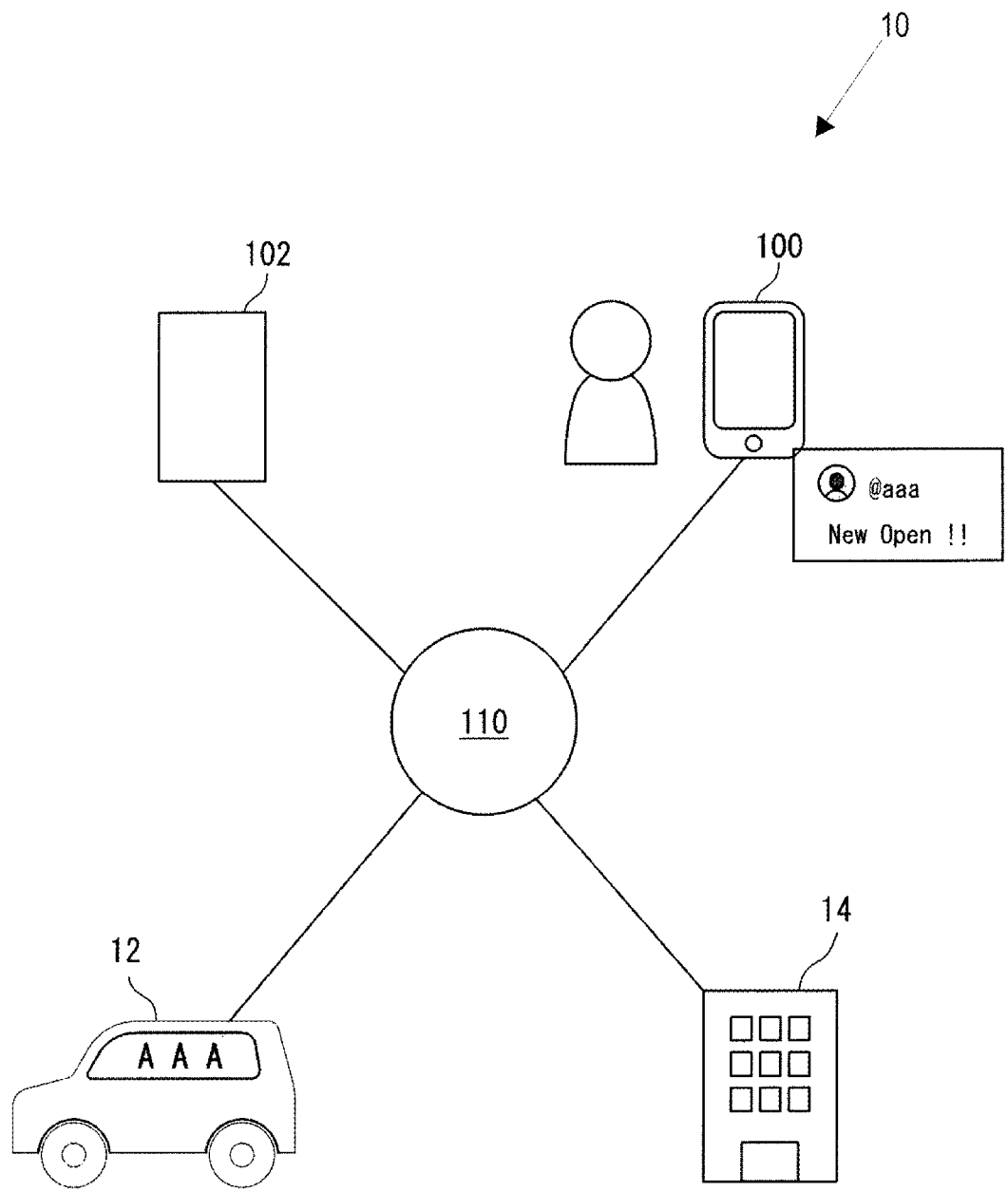
FIG. 1 is a diagram showing a configuration of an on-board signage system.
Figure 2:
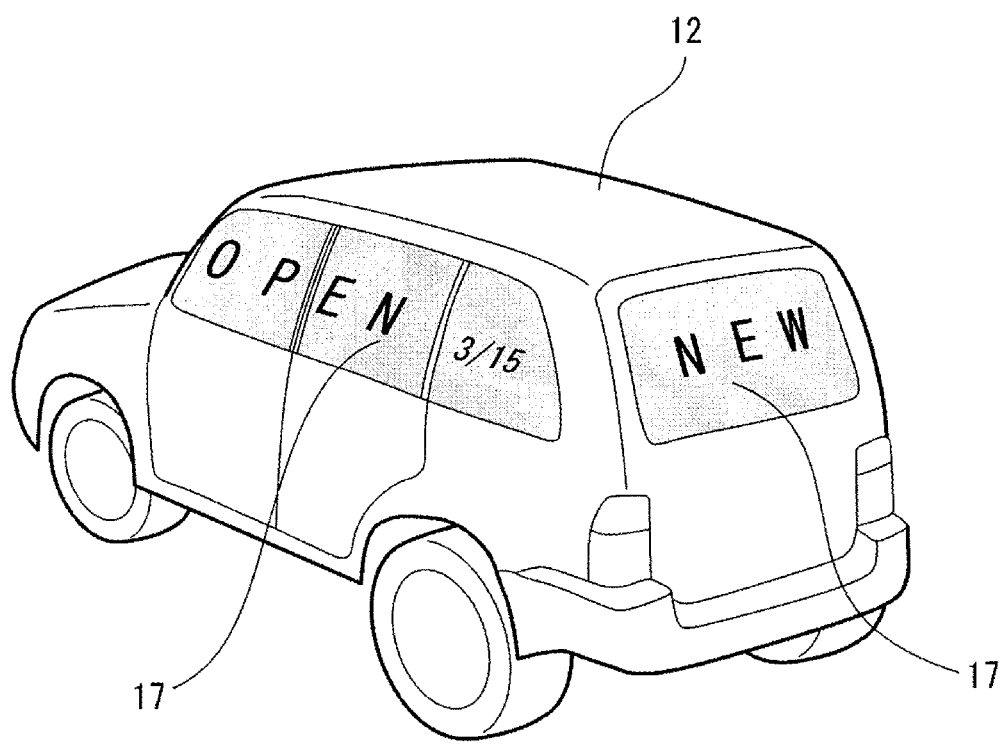
FIG. 2 is an external view of a vehicle used in the on-board signage system.

Hereinafter, a configuration of an on-board signage system 10 will be described with reference to the drawings. FIG. 1 is a diagram showing the configuration of the on-board signage system 10, and FIG. 2 is an external view of a vehicle 12 used in the on-board signage system.

The on-board signage system 10 is a system which causes the vehicle 12 to travel under a condition that various images are displayed on the vehicle 12 for advertising. Here, the term "advertising" means an activity of an organization or an individual for propagating information toward the general public, and includes, of course, publicizing activities of public relations for commercial purposes and also includes publicizing activities for public welfare. Therefore, the "advertising" as used herein includes, for example, a publicizing activity performed for goods or services by a company, a publicizing activity for disseminating evacuation information in the event of a disaster, and other publicizing activities.

The on-board signage system 10 includes one or more vehicles 12, and a management center 14 capable of communicating with the vehicles 12. Each vehicle 12 has a display area 17 disposed at a position viewable from outside the vehicle 12 as shown in FIG. 2, and an image assigned to the vehicle 12 is displayed on the display area 17. The vehicle 12 is configured to function as movable digital signage by displaying the image on the display area 17. The management center 14 is connected to a public communication network (i.e., an Internet channel 110). The Internet channel 110 is also connected with an SNS server 102 and user terminals 100 of SNS users.

The SNS users can get service provided by the SNS server 102 through their own user terminals 100. Specifically, the SNS users are able to upload content to the SNS server 102 through their own user terminals 100. Hereinafter, content which is uploaded to the SNS server 102 is referred to as "post content" or "a post content item".

The SNS users can view through their own user terminals 100 post content items uploaded by themselves or by other people, and also can post evaluations and comments regarding the uploaded post content items as appropriate. Further, the SNS users can cite a post content item, which they viewed, to repost the viewed post content item. Still further, an SNS user can register another SNS user as his or her favorite user. Hereinafter, to register another user as a favorite user is referred to as "to follow", and a user who follows another user is referred to as a "follower". The SNS server 102 manages the evaluations and the comments regarding the post content items, the number of reposts, the number of followers of each SNS user, etc., and publishes them on the Internet.

The management center 14 downloads and collects from the SNS server 102 the post content items and accompanying data thereof (such as, for example, a posted time and date and the number of comments). Each collected post content item is associated with a location (hereinafter, referred to as a "relevant location") relating to the post content item itself and recorded in a post database 70 (see FIG. 6) of the management center 14, which will be described in detail further below. The management center 14 selects, based on information recorded in the post database 70, at least one of a travel route of the vehicle 12 and an image to be assigned to the vehicle 12, and transmits the selected travel route or image to the vehicle 12.

Before explaining specific components of the on-board signage system 10, operation forms of the on-board signage system 10 are briefly described. The operation forms of the on-board signage system 10 in this example are broadly categorized into two forms. In a first operation form, an image to be displayed on the vehicle 12 is previously determined, and the management center 14 selects a travel route with a view toward increasing an advertising effect of the image. In such a case, the vehicle 12 is mainly intended for advertising and is not intended, in principle, for transporting people or goods. Further, in this case, the management center 14 estimates a region suitable for presentation of the image assigned to the vehicle 12, based on the information recorded in the post database 70, and selects the travel route of the vehicle 12 based on the estimated region.

Figure 3:
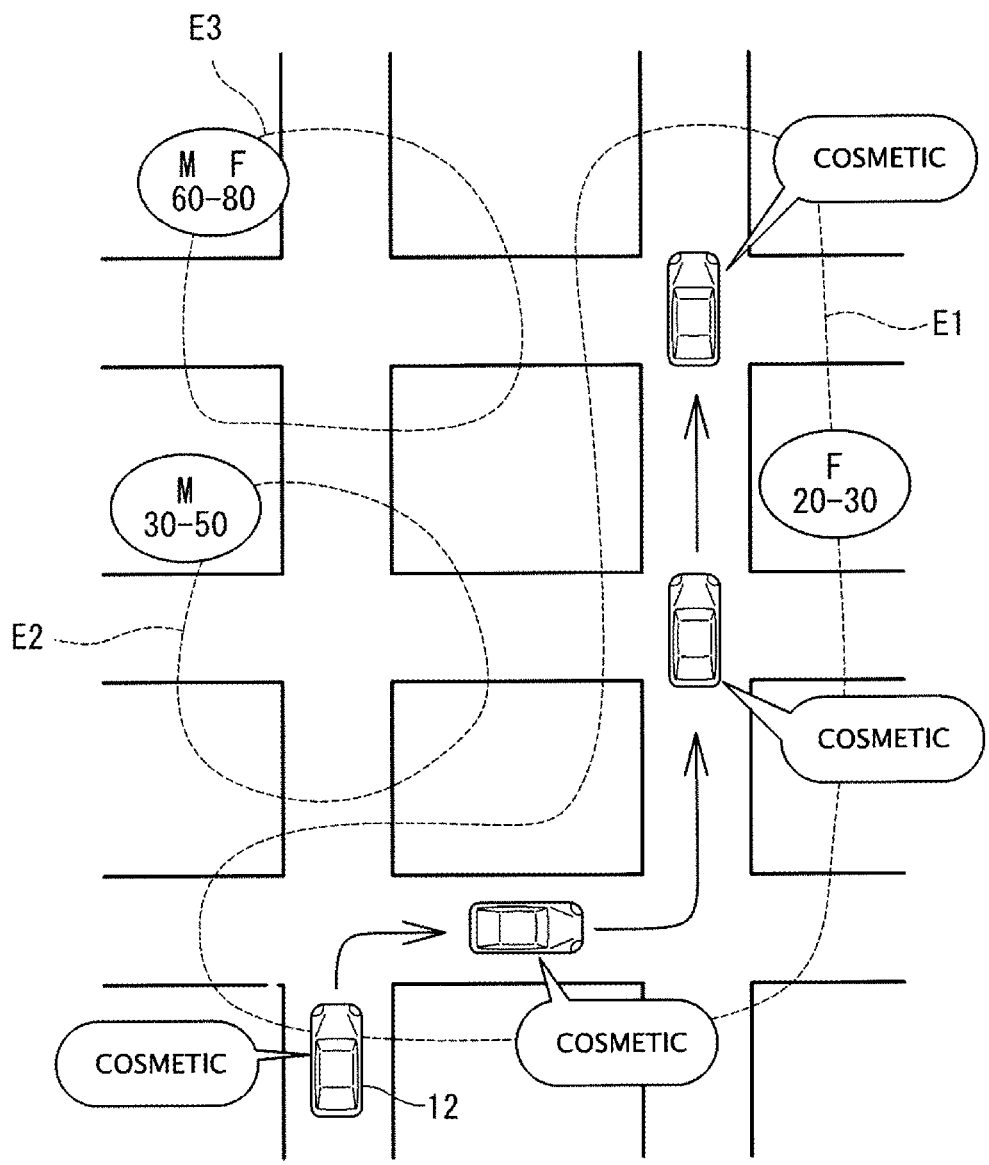
FIG. 3 is a diagram for explaining a first operation form.

FIG. 3 is a diagram for explaining the first operation form. It is assumed that the management center 14 finds, as a result of analyzing the post content items, that a first area E1 includes many women in their twenties and thirties, a second area E2 includes many men in their thirties to fifties, and a third area E3 includes a lot of men and women in their sixties to eighties as shown in FIG. 3. It is further assumed that the vehicle 12 is previously assigned with an image targeted for women, such as, for example, an advertising image of a cosmetic. In the thus-assumed situation, the management center 14 determines the travel route of the vehicle 12 in such a manner that the vehicle 12 travels along a route that matches the assigned image; specifically, a route which passes through an area where there are a lot of women. In the example of FIG. 3, because the first area E1 includes many women, the management center 14 selects a route along which the vehicle 12 travels through the first area E1 for a longer length of time, and transmits the selected route to the vehicle 12. Then, the vehicle 12 travels along the transmitted route.

In a second operation form, the management center 14 is not involved in determination of the travel route of the vehicle 12, and instead determines the image which is assigned to the vehicle 12. In this case, the travel route of the vehicle 12 is exclusively determined in the vehicle 12, and the vehicle 12 is mainly intended for transporting people or goods. In this situation, the management center 14 receives from the vehicle 12 a vehicle location which may be a present location or a future location of the vehicle 12, and estimates a trend of people or a situation of a region located in a vicinity of the vehicle location based on the information recorded in the post database 70. Then, the management center 14 selects, based on the estimated trend or situation, an image which matches the vehicle location and transmits the selected image to the vehicle 12.

Figure 4:
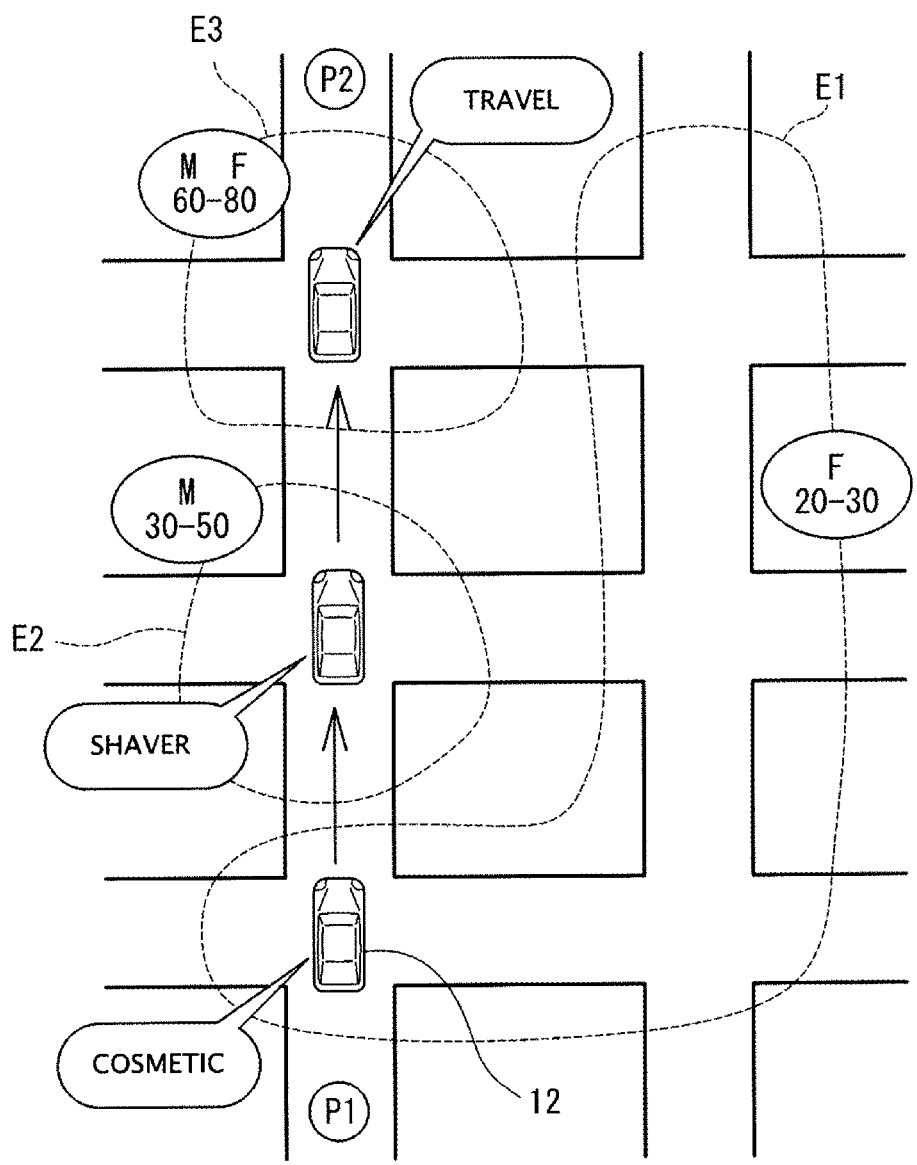
FIG. 4 is a diagram for explaining a second operation form.

FIG. 4 is a diagram for explaining the second operation form. In FIG. 4, the distribution of people is identical to that in FIG. 3. On the other hand, it is assumed that the vehicle 12 sequentially passes through the first area E1, the second area E2, and the third area E3 in order to move from a departure place P1 to a destination P2. In this situation, the management center 14 assigns to the vehicle 12 an image targeted for women, such as, for example, the advertising image of a cosmetic when the vehicle 12 is traveling through the first area E1 where there are many women in their twenties and thirties. Further, when the vehicle 12 enters, after passing through the first area E1, the second area E2 where there are many men in their thirties to fifties, the management center 14 assigns to the vehicle 12 an image targeted for men, such as, for example, an advertising image of a shaver. Still further, when the vehicle 12 enters the third area E3 where there are a lot of men and women in their sixties to eighties, the management center 14 assigns to the vehicle 12 an image targeted for elderly people, such as, for example, an advertising image of a travel tour designed for elderly people. The assigned images are transmitted to the vehicle 12 as needed and displayed on the display area 17 of the vehicle 12.

Figure 5:
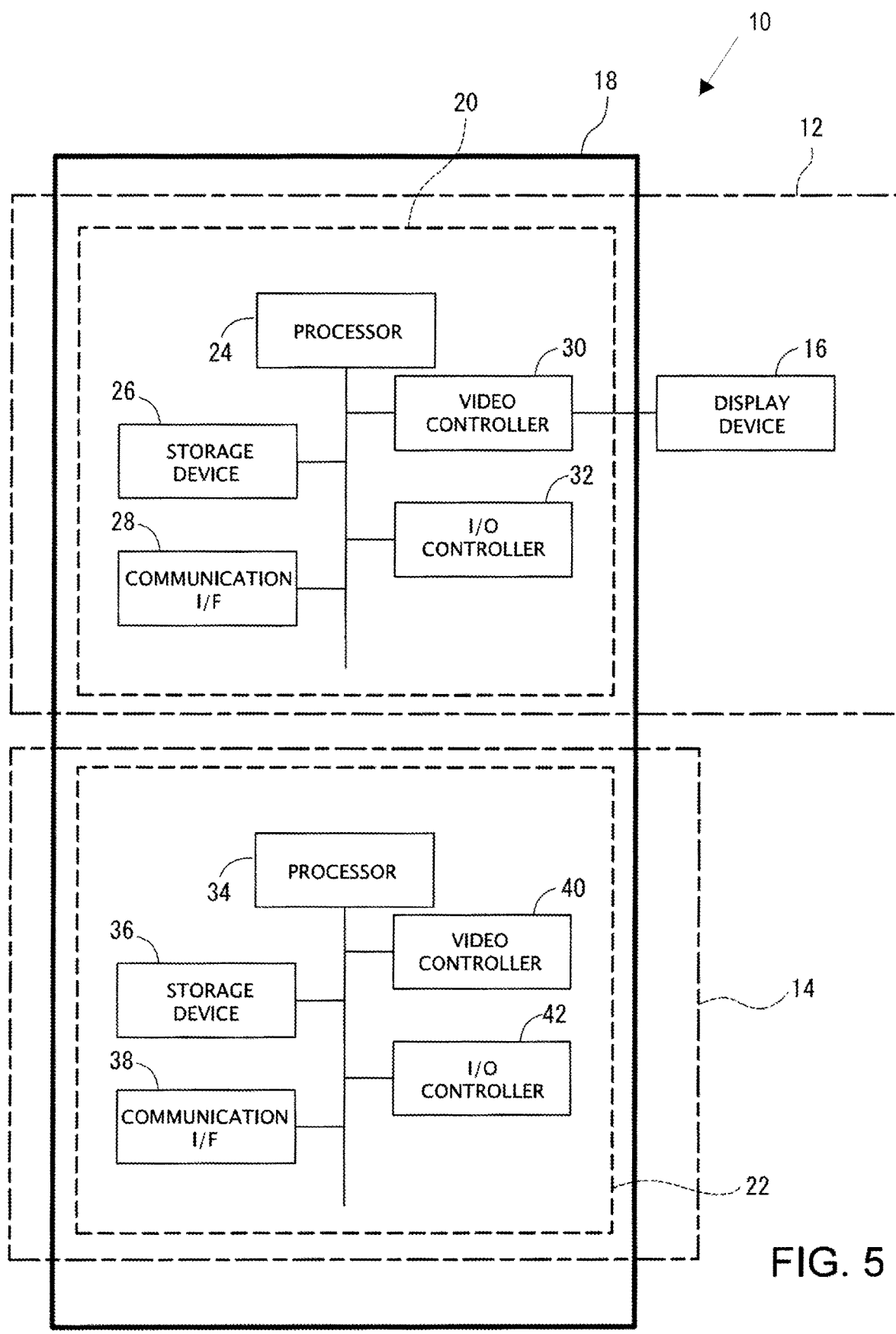
FIG. 5 is a block diagram showing a physical configuration of the on-board signage system.
Figure 6:
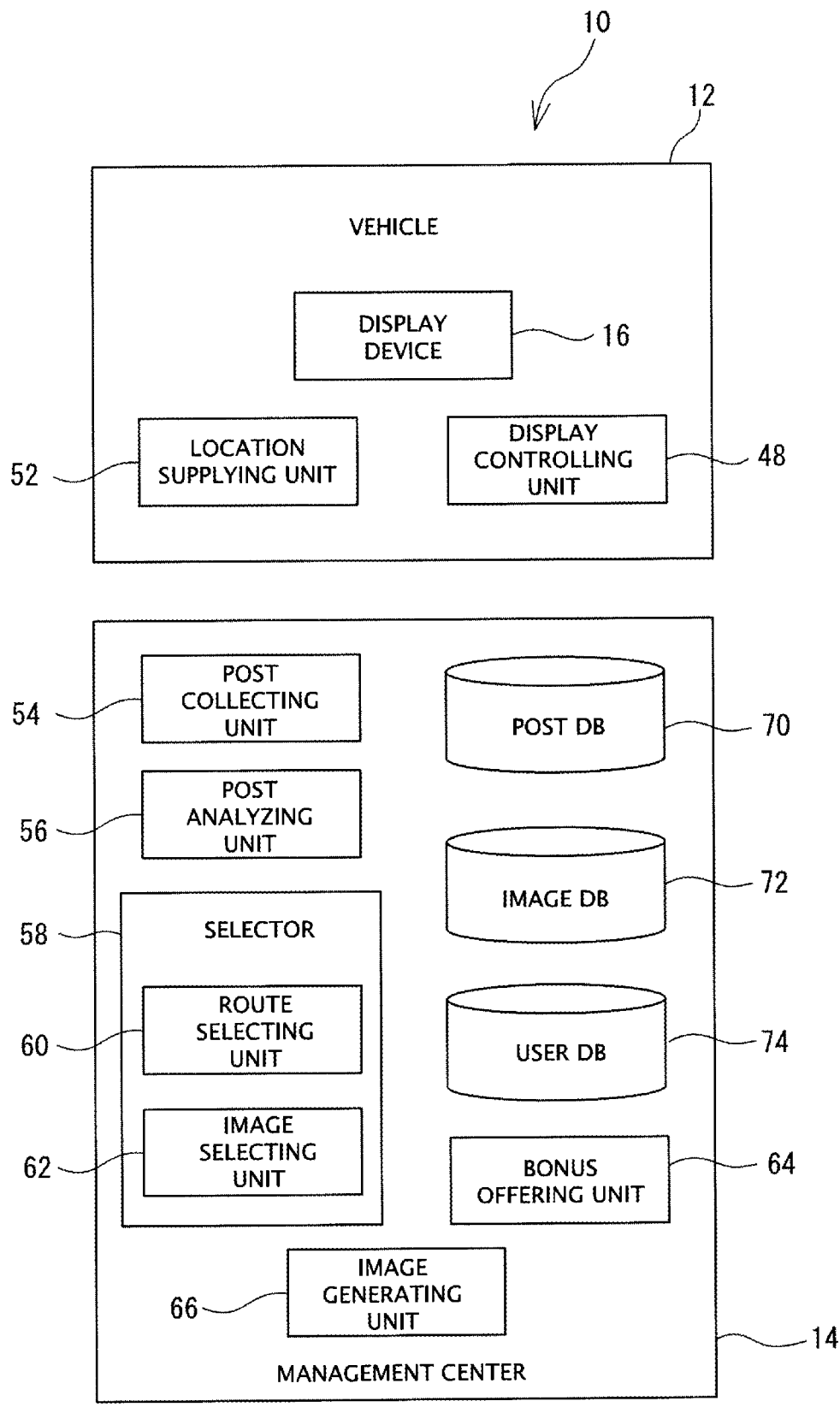
FIG. 6 is a block diagram showing a functional configuration of the on-board signage system.

Next, specific components of the on-board signage system 10 are explained with reference to FIGS. 5 and 6. FIG. 5 is a block diagram showing a physical configuration of the on-board signage system 10, and FIG. 6 is a block diagram showing a functional configuration of the on-board signage system 10.

In a physical aspect, the on-board signage system 10 includes one or more vehicles 12, a display device 16 installed in each of the vehicles 12, and a signage controller 18. The signage controller 18 is configured to control operation of each component in the on-board signage system 10. The signage controller 18 is composed, as will be explained in detail below, of a vehicle controller 20 installed in each of the vehicles 12 and a center controller 22 installed in the management center 14.

The type and shape of the vehicle 12 is not limited to any specific type and shape, so long as the vehicle 12 has the display area 17 at a position viewable from outside the vehicle 12. Therefore, the vehicle 12 may be a passenger vehicle as illustrated in FIG. 2, a truck which is mainly intended for transporting cargoes, or a bus which is mainly intended for transporting an unspecified large number of people. Further, the vehicle 12 may be a vehicle which is mainly used for a purpose of transporting people or goods, such as, for example, a private automobile, a freight truck, or a fixed-route bus, or may be a vehicle which is mainly used for a purpose of advertising; i.e., a so-called billboard truck. Still further, the vehicle 12 may be configured to be controlled in most of its operations including acceleration, deceleration, and steering by a driver of the vehicle 12, or may be a driver-assisted vehicle or an automated vehicle whose operations including acceleration, deceleration, and steering are partially or entirely controlled by the vehicle 12 itself. In either case, the vehicles 12 and the owners thereof are previously registered in the on-board signage system 10, and information of the vehicles 12 and the owners thereof is stored in a user database 74 of the management center 14.

Each of the vehicles 12 includes the display device 16 which is configured to display an image on the display area 17 viewable from outside the vehicle 12. As the display device 16, for example, a display disposed on an exterior surface of the vehicle 12 may be used. In such a case, the display functions as the display area 17. When the display device 16 is the display, the display device 16 may be attached to the exterior surface of the vehicle 12 or attached to an inner surface of a window glass of the vehicle 12. Alternatively, the display device 16 may be composed, as shown in FIG. 2, of a transparent display, and the transparent display may be arranged within a window of the vehicle 12 in place of the window glass of the vehicle 12. In a case where the display arranged within the window hampers a vehicle occupant from viewing outside scenery through the window, a camera for capturing images of the outside scenery may be mounted on the vehicle 12 along with a display which is configured to display the images captured by the camera.

Further alternatively, the display device 16 may be a projector which projects the image onto a portion (such as, for example, an engine hood or a trunk hood) of the vehicle 12 or onto a road surface. In such a case, an area onto which the image is projected by the projector serves as the display area 17.

It may be the case that only one display area 17 is disposed on the vehicle 12, or two or more display areas 17 may be disposed on the vehicle 12. For example, the display area 17 may be disposed on both a rear surface and a side surface of the vehicle 12 as illustrated in FIG. 2. In this case, the display area 17 on the rear surface and the display area 17 on the side surface may display the same image or may display images which differ from each other.

The signage controller 18 is composed of the vehicle controller 20 and the center controller 22. The vehicle controller 20 is a computer incorporating a processor 24, a storage device 26, a communication interface 28, a video controller 30, and an input/output controller 32. The term "computer" as used herein encompasses a microcontroller in which a computer system is incorporated into a single integrated circuit. It should be noted that the processor 24 denotes a processor in a broad sense and includes a general-purpose processor (such as, for example, a Central Processing Unit, CPU), and a special-purpose processor (such as, for example, a Graphics Processing Unit, GPU; an Application Specific Integrated Circuit, ASIC; a Field Programmable Gate Array, FPGA; and a programmable logic device).

The storage device 26 may include at least one of a semiconductor memory (such as, for example, a RAM, a ROM, and a solid state drive) and a magnetic disc (such as, for example, a hard disc drive).

The communication interface 28 allows the vehicle 12 to communicate with various devices located outside the vehicle 12. The communication interface 28 may support a plurality of types of communication protocols. Therefore, the communication interface 28 may include a communication facility capable of Internet communication through a wireless LAN, such as, for example, Wi-Fi (Registered Trademark), or through mobile data communication services provided by mobile phone companies, or the like. In addition, the communication interface 28 may include a communication facility (such as an antenna) for Dedicated Short Range Communication (DSRC) to communicate with other vehicles and infrastructure facilities on roads without using the Internet. The vehicle controller 20 transmits and receives a variety of data items to and from the management center 14. It should be noted that while the vehicle 12 is also connected to the Internet channel 110 in FIG. 2, the vehicle 12 which can communicate at least with the management center 14 is not necessarily connected to the Internet channel 110.

The video controller 30 controls display operation of the display device 16 under the control of the processor 24. The input/output controller 32 controls operation to exchange data with devices mounted on the vehicle 12, such as, for example, a location sensor and a navigation device.

It should be noted that the vehicle controller 20 which is illustrated as a single computer in FIG. 5 may be composed of a plurality of computers which are physically separated. Therefore, the controller 20 may include a plurality of processors 24.

The center controller 22 is also composed of a computer which incorporates, similarly with the vehicle controller 20, a processor 34, a storage device 36, a communication interface 38, a video controller 40, and an input/output controller 42. As used herein, the term "computer" encompasses a microcontroller in which a computer system is incorporated into a single integrated circuit. Further, the processor 34 is a processor in a broad sense, and thus includes a general-purpose processor and a special-purpose processor.

The storage device 36 may include at least one of a semiconductor memory (such as, for example, a RAM, a ROM, and a solid state drive) and a magnetic disc (such as, for example, a hard disc drive). Further, the storage device 36 is not necessarily located, in its entirety, at the same physical location as the processor 34 or other components, and may include a storage device located in a cloud. The communication interface 38 is a component which enables communication with various external devices located outside of the management center 14, and may include, for example, a communication facility for establishing Internet communication. Further, the center controller 22 is not necessarily composed of a single computer, and may be composed of a plurality of computers capable of establishing wired or wireless communication.

In a functional aspect, the vehicle 12 includes, as shown in FIG. 6, the display device 16, a display controlling unit 48, and a location supplying unit 52. The display device 16 is, as described above, configured to display the image on the display area 17. The display controlling unit 48 is configured to operate the display device 16 to display the assigned image transmitted from the management center 14.

The location supplying unit 52 transmits to the management center 14 the location information indicative of a present or future vehicle location of the vehicle 12 in response to a request from the management center 14. The vehicle location transmitted to the management center 14 may be, for example, a detection result from the location sensor (such as, for example, a GPS sensor) mounted on the vehicle 12. Alternatively, while a navigation device mounted on the vehicle 12 is performing route guidance, a travel route specified by the navigation device may be transmitted as the vehicle location to the management center 14.

A post collecting unit 54 in the management center 14 accesses the SNS server 102 via the Internet channel 110 to download post content items which are uploaded by various users, along with information accompanying the post content items. The function of the post collecting unit 54 may be implemented, for example, by executing a program that is referred to as a crawler, a bot, a spider, a robot, or the like. The post content items to be collected may include, in addition to text data, data of marks, such as emoji and stamps, image data, and audio data. The accompanying information may include attribute information of the post content item and attribute information of a contributor who has posted the item. The attribute information of the post content item includes a posted time and date, the number of evaluations, the number of comments, the number of reposts, and other characteristics of the post content item. The attribute information of the contributor may include age, gender, and other characteristics of the contributor, and may also include the number of followers of the contributor.

A post analyzing unit 56 analyzes the collected post content items to extract relevant locations which are location information relating to the post content items. Each of the relevant locations is a location associated with the subject of the post content item. The relevant location is extracted based on information contained in the post content item and a location where the post content item is posted. When a single post content item includes two or more subjects, the relevant location may be extracted for each of the subjects.

For example, an instance is assumed, in which a woman who is a fan of a singer, Mr. * uploads a post content item including text "Go to xxx town to attend a concert of Mr. *, and then have a meal with a friend in yyy mall". In this instance, the "xxx town" related to a first subject which is "a concert of Mr. ***" is extracted as a first relevant location, and the "yyy mall" related to a second subject which is "a meal with a friend" is extracted as a second relevant location.

For extraction of such relevant locations, a text mining technique, an image analyzing technique, and a voice analyzing technique may be used. For example, the post analyzing unit 56 divides the post content item into text data, mark data, image data, and voice data. The post analyzing unit 56 processes text data by text mining. Specifically, the post analyzing unit 56 performs morphological analysis to divide text into a plurality of morphemes, and subsequently classifies the morphemes contained in the text under parts of speech, such as nouns, verbs, adjectives, and adverbs. Then, the post analyzing unit 56 identifies, from the nouns and the verbs, the subject, the relevant location, the time, and other features of the content item. Further, the post analyzing unit 56 identifies, from the adjectives and the adverbs, feelings and preferences of the contributor. For identifying and extracting words as described above, an artificial intelligence (AI) using a machine learning technique, such as a neural network, may be utilized.

For the mark data, a dictionary storing mark data and corresponding meanings thereof may be previously prepared, and the meaning of mark data may be interpreted with reference to the dictionary. The voice data are converted into text data by the voice analyzing technique and the converted text data are processed through the above-described text mining.

The image data are processed by the image analyzing technique to extract the subject in the image data. For example, the post analyzing unit 56 uses the image analyzing technique to extract objects captured in the image and identifies, for each of the objects, what the object is. For identification of the objects, the AI using the machine learning technique may be utilized. Alternatively, a reference image similar to the image of an extracted object may be retrieved from a plurality of reference images whose subjects are known, and the subject of the extracted object may be recognized based on the extracted reference image.

In addition, the post analyzing unit 56 uses results of the above-described analysis to extract post content items relating to the image displayed on the vehicle 12 as the responded post content items. The responded post content items are used for offering a bonus, which will be explained below.

The post database 70 stores post-related information obtained from the post content item in association with the extracted relevant location. Here, the post-related information stored in the post database 70 may be data of the post content item itself (so-called "raw data") or may be information of a plurality of divided elements obtained after analyzing the post content item in the post analyzing unit 56. In addition, the post-related information may further include information accompanying the post content item (such as, for example, the attribute of a contributor who has posted the post content item, posted time and date, and the number of evaluations of the post content item). FIG. 7 shows an example of data items stored in the post database 70. In the example of FIG. 7, a plurality of elements contained in the post content item and accompanying information thereof are associated with each other and stored in the form of a table. It should be noted that although FIG. 7 shows the relevant location in latitude and longitude, the relevant location may be expressed in other forms, such as, for example, a form of a regional designation (for example, "xxx town") or a form of a facility name (such as, for example, "yyy mall").

An image database 72 stores a plurality of candidate images and selection conditions of the candidate images, in which each of the candidate images is associated with the corresponding selection condition. The candidate image is a candidate of the image to be assigned to the vehicle 12; i.e., the image to be displayed on the display area 17 of the vehicle 12. The candidate image may be a static image or a moving image. The candidate image may be an advertising image presented for a commercial purpose, or an emergency image used for conveying necessary information in the event of a disaster. The candidate images may be supplied from a requester who requests advertisement by the on-board signage system 10, or may be generated in a below-described image generating unit 66.

Each candidate image is linked to its selection condition. The selection condition is a condition based on which the corresponding candidate image is selected as an assigned image. The selection condition includes, for example, a target condition defining a condition of a target person to whom the corresponding candidate image is intended to be presented, or a condition of a region where the corresponding candidate image is intended to be displayed. Specifically, the target condition may include at least one of attributes (such as, for example, age, gender, family members, and professional occupation) of the target person, action histories (such as, for example, a search history, and a commodity purchase history) of the target person, the target person's preferences, the regional designation of a target region, and characteristic features (such as, for example, "a power blackout area") of the target region.

For example, a condition of "gender: male" may be specified as a target condition of an advertising image for advertising a shaver. Further, for the candidate image being the advertising image, the target condition may include preferences of the target person to whom the advertising image is intended to be presented. For an advertising image of a romance movie in which the singer, Mr. * appears, people who like movies, romantic dramas, or Mr. * will be target viewers of the advertising image. Therefore, a condition of "preference: movie, romantic drama, the singer, Mr. ***" may be defined as the target condition of the advertising image. On the other hand, when the candidate image is the emergency image, the target condition may include a disaster situation in a disaster-stricken region or a situation of damage to people targeted for the emergency image. For example, a target condition of "region: power blackout area" may be specified as a target condition of an emergency image used for conveying help information (such as, for example, information on "temporary power charging sites") that is needed when a large-scale blackout occurs.

In addition, the selection condition may further include a temporal condition, a display period, a priority level, etc. of the corresponding candidate image. The temporal condition defines a time zone in which the candidate image is displayed, and a time period of "nighttime", for example, is specified as the temporal condition to a candidate image that is intended to be displayed only at night. The display period defines a time period in which the candidate image is displayed, and a condition of several weeks before and after an opening date of a new store, for example, is specified as the display period to an image of advertising opening of the new store.

The priority level defines prioritization of the corresponding candidate image. The candidate image that is assigned a higher priority level is more preferentially selected. The priority level is determined, for example, by the fee paid for displaying the candidate image, the degree of urgency associated with the candidate image, or the degree of public benefit contributed by the candidate image. For example, the candidate image that is charged at a higher rate may be assigned a higher priority level. Meanwhile, in the event of a disaster, an emergency image may be prioritized. In addition, each candidate image may be further linked to a track record of actual display of the candidate image, such as, for example, an accumulated length of displayed time of the candidate image. FIG. 8 shows an example of data items recorded in the image database 72. In the example of FIG. 8, candidate image IDs are stored in the form of a table in which they are associated with various selection conditions.

A selector 58 includes a route selecting unit 60 and an image selecting unit 62. The route selecting unit 60 is a component that is utilized in the first operation form, and is configured to select a travel route that matches the image assigned to the vehicle 12. To select the travel route, the route selecting unit 60 checks the ID of the image assigned to the vehicle 12 against the image database 72 to acquire the selection condition of the assigned image. Then, the route selecting unit 60 estimates, based on the information recorded in the post database 70, a region that satisfies the selection condition or a region including a lot of people who satisfy the selection condition, and selects the travel route that passes through the estimated region.

A method for estimating the region is not specifically limited to any particular method. As one example of the method, the estimation may be implemented in such a manner that points are scored for each of a plurality of post-related information items stored in the post database 70 based on a degree of relevance to the target condition of the image assigned to the vehicle 12, and a region having a greatest sum total of scored points may be selected as the region which satisfies the selection condition or the region including a lot of people who satisfy the selection condition. Here, the number of points scored for each of the post-related information items may be increased as the degree of relevance to the target condition becomes greater or as a magnitude of response to the post-related information becomes greater. The magnitude of response may be calculated based on at least one of the numbers of evaluations, reposts, and comments regarding the post content item which is a source of the post-related information and the number of followers of the contributor.

In a case where the image assigned to the vehicle 12 is an advertising image, the route selecting unit 60 may estimate a region where there are a lot of people whose preferences match the advertising image, and select the travel route of the vehicle 12 based on the estimated region. This is because a high degree of advertising effect is often obtained by weighting the preferences of the target people heavier than the attributes of the target people and regional characteristics in selection of the travel route when the image is the advertising image. Further, because the content items posted to the SNS sites by people are apt to reflect individual preferences of the people, such personal preferences can be easily acquired from the post content items. It should be noted that the preferences that match the advertising image may be previously specified as the target condition or may be estimated by the AI.

On the other hand, in a case where the image assigned to the vehicle 12 is an emergency image, the route selecting unit 60 may estimate a region where the emergency image is needed, and select the travel route of the vehicle 12 based on the estimated region. The region where the emergency image is needed can be estimated from disaster situations and damage situations that are written in the post content items. The AI may be also utilized for the estimation. Here, the content items posted to the SNS sites are superior to information reported through conventional media such as televisions, newspapers, and Internet news channels, in terms of rapidity in conveying information. In addition, because the post content items on the SNS sites are uploaded from a variety of regions, the situations can be elaborately assessed from the post content items. When the region where the emergency image is needed is estimated based on the SNS post content items, it can be ensured that necessary information is conveyed, in the event of a disaster, to people who need the information, with a high degree of reliability.

The image selecting unit 62 is a component utilized in the second operation form, and is configured to select an image to be assigned to the vehicle 12 from the candidate images recorded in the image database 72 and transmit the selected image to the vehicle 12. To select the image, the image selecting unit 62 requests the vehicle 12 to supply a present or future vehicle location of the vehicle 12 itself. In response to the request, the vehicle 12 transmits its vehicle location to the management center 14. The image selecting unit 62 checks the supplied vehicle location against the post database 70 to extract the post-related information corresponding to the supplied vehicle location. Then, the image selecting unit 62 estimates, based on the extracted post-related information, an image that matches people located in a vicinity of the vehicle location or a region in the vicinity of the vehicle location, and assigns the estimated image to the vehicle 12.

In the case of assigning the advertising image to the vehicle 12, the image selecting unit 62 may estimate the preferences of people located in the vicinity of the vehicle location based on the post-related information corresponding to the vehicle location, and select an advertising image to be assigned to the vehicle 12 based on the estimated preferences. This is based on a notion as described above that a high degree of advertising effect is often obtained in the case of assigning the advertising image by placing weight on the preferences of the target people. On the other hand, in the event of a disaster, the image selecting unit 62 may estimate a disaster situation in a region close to the location of the vehicle 12 or a situation of damage to people located in the region, based on the post-related information corresponding to the vehicle location, and select an emergency image to be assigned to the vehicle 12 based on the estimated situation.

Further, the image selecting unit 62 generates the emergency image based on the post-related information recorded in the post database 70 and stores the generated emergency image in the image database 72. When a disaster occurs, as the situation of damage changes every second, necessary information accordingly changes from moment to moment. The SNS post content items which are superior in rapidity to information obtained through other conventional media can often transmit necessary information at an early stage of the disaster. In this respect, the image selecting unit 62 generates the emergency image based on the post content items which are posted at all times.

Figure 9:
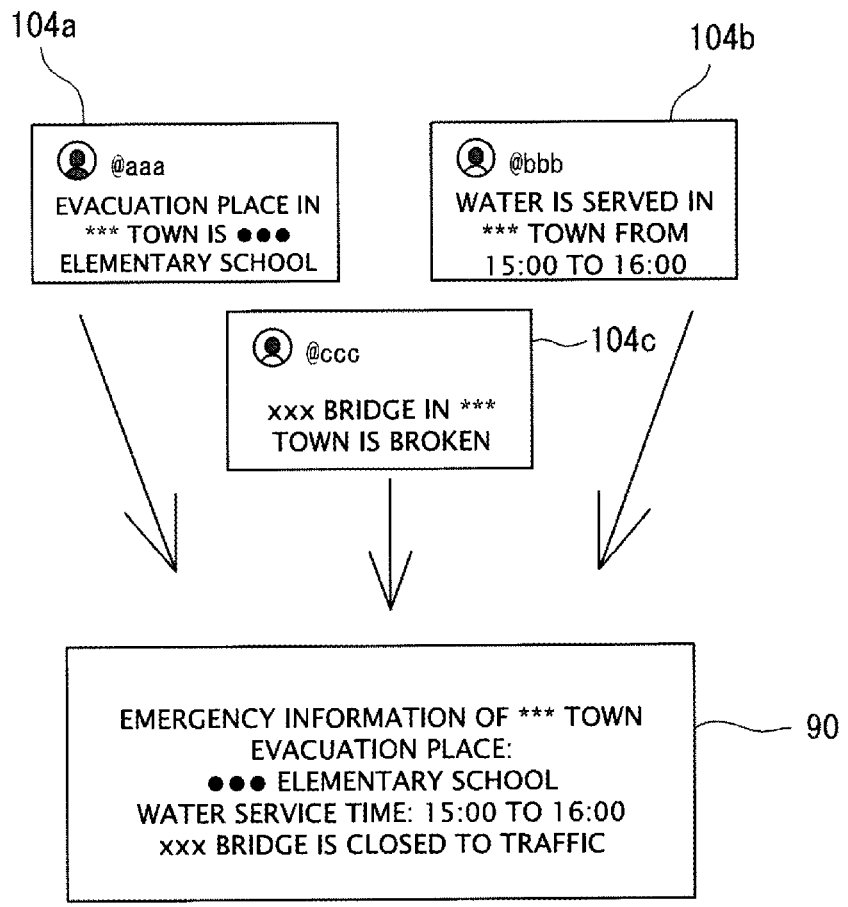
FIG. 9 is a diagram for explaining a way of generating an emergency image.

FIG. 9 is a diagram for explaining a way of generating an emergency image. For example, it is assumed as shown in FIG. 9 that post content items 104a to 104c describing emergency information in * town are uploaded by a plurality of users in the event of a disaster. In the example of FIG. 9, the plurality of users have posted an evacuation place in * town, a water serving time period, and a situation of damage to a bridge located in * town. The post content items 104a to 104c are collected by the post collecting unit 54, and recorded in the post database 70 in association with a relevant position, which is * town in this example, by the post analyzing unit 56. It can be estimated that as the number of posts of the post content items 104a to 104c including the above-described emergency information and the number of evaluations about the post content items 104a to 104c become greater, the emergency information increases in importance. Therefore, when the post content items 104a to 104c relating to the emergency information which can be determined to be of high importance are found, the image generating unit 66 generates an emergency image 90 based on the found post content items 104a to 104c. In the example of FIG. 9, a target condition of "region: * town" is specified as the target condition to the generated emergency image 90, and the emergency image 90 is recorded together with the specified target condition in the image database 72**.

Such an emergency image may be generated based on the situation of damage rather than the region. For example, it is assumed that a plurality of users have uploaded post content items including information to cope with a power blackout, such as, for example, information items describing "Throw the circuit breaker in the power off position to prevent fire caused by reenergization", "A PET bottle filled with water and placed on a smartphone can serve as a substitute lamp", "A makeshift oil lamp can be created using a can of canned tuna in oil", and the like. When there are a great number of post content items including such coping information and evaluations of the post content items, the image generating unit 66 may generate, based on those post content items, the emergency image for conveying the information to cope with a power blackout. Then, a target condition of "region: blackout area" is specified to the generated emergency image, and the generated emergency image is recorded together with the specified target condition in the image database 72.

It should be noted that while the post content items on the SNS sites are superior in rapidity and variety, whether the content item is true or not is in many cases unknown. For this reason, before the emergency image is generated, information contained in each of the post content items may be previously subjected to fact checking. The fact checking may be performed, for example, by checking the post content item of interest against another post content item which is posted by a previously confirmed reliable contributor (such as, for example, a public organization including a municipality, for example).

A bonus offering unit 64 is configured to offer, when a post content item relating to the vehicle 12 which is displaying the image is posted, a bonus to at least one of the owner of the vehicle 12 and a user who has posted the post content item. Specifically, the post analyzing unit 56 extracts, as described above, the post content item relating to the vehicle 12 which is displaying the image as a responded post content item. Here, the post content item relating to the vehicle 12 which is displaying the image means a post content item containing a captured image of the vehicle 12 which is displaying the image. When the responded post content item is obtained, the post analyzing unit 56 sends the obtained responded post content item to the bonus offering unit 64.

The bonus offering unit 64 identifies from the responded post content item at least one of the owner of the posted vehicle 12 and the contributor who has uploaded the responded post content item, and offers the bonus to the at least one of the owner and the contributor. The bonus is not limited to a specific item so long as the item can create a motivation for displaying the image or uploading a content item to an SNS site. For example, the bonus may be, for example, an amount of money, points which can be used for shopping or for an application for a present, or a membership rank in a specific club (such as, for example, a fan club). Further, the bonus to be offered in this example may vary depending on a magnitude of impact of the responded post content item. For example, the bonus to be offered in this example may be increased as the number of followers of the contributor becomes higher.

The user database 74 previously stores information on a plurality of registered users. The registered users may include owners of the vehicles 12 and SNS contributors. The user database 74 stores attributes and contact details of each of the registered users along with a present bonus value of each of the registered users. For the registered user being the owner of the vehicle 12, identification information of the vehicle 12 is associated with identification information of the registered user. On the other hand, for the registered user being the SNS contributor, an SNS account of the registered user is associated with identification information of the registered user. The bonus offering unit 64 refers to the user database 74 in order to identify a target to which the bonus is given, and updates the recorded bonus value and other values as needed. Here, identification information, such as, for example, a QR Code (registered trademark) or ID, used for vehicle identification may be attached to the image displayed on each of the vehicles 12 or to a place close to the display area 17 of each of the vehicles 12, in order to identify which one of the vehicles 12 displays the image that is posted to the SNS site.

Figure 10:
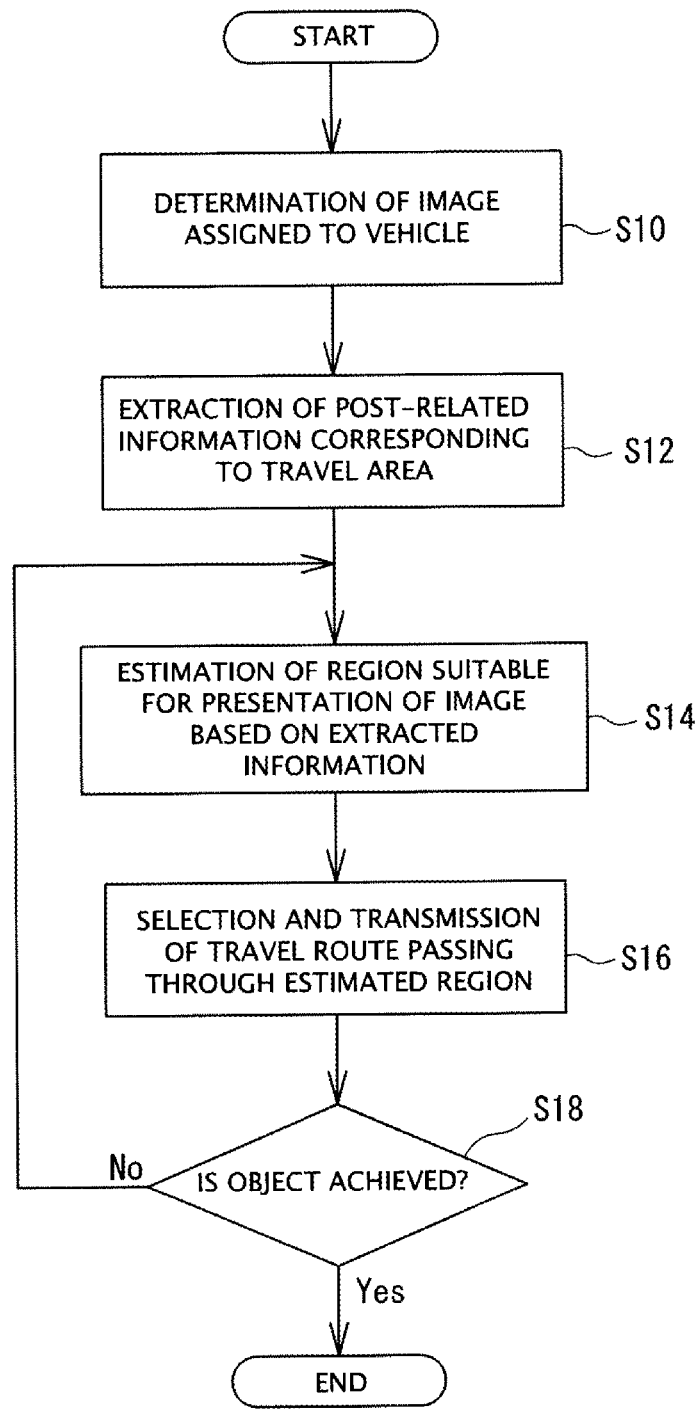
FIG. 10 is a flowchart showing a flow of process steps performed in the first operation form by the on-board signage system.

Next, a flow of process steps in the on-board signage system 10 is described. FIG. 10 is a flowchart showing a flow of process steps performed in the first operation form by the on-board signage system 10. In the first operation form, the image assigned to the vehicle 12 is initially determined as described above (step S10). The determination of the image may be performed by a person, or may be automatically performed by the management center 14 based on the priority level recorded in the image database 72.

After the image to be assigned to the vehicle 12 is determined, the management center 14 extracts post-related information relating to a travelable area (step S12). Here, any destinations or other places to go of the vehicle 12 are undecided in the first operation form, although the travelable area of the vehicle 12 is limited to a certain extent. For this reason, the management center 14 extracts from the post database 70 only the post-related information corresponding to the travelable area of the vehicle 12.

Following the extraction, the management center 14 estimates, based on the extracted post-related information, a region suitable for presentation of the assigned image (step S14). Specifically, the management center 14 compares the extracted post-related information against the selection condition of the assigned image to estimate a region that satisfies the selection condition of the assigned image or a region including a lot of people who satisfy the selection condition of the assigned image. Here, when the assigned image is an advertising image, a region where there are a lot of people whose preferences match the advertising image may be estimated as the region suitable for presentation of the assigned image. On the other hand, when the assigned image is an emergency image, a region where there are a lot of people who need the emergency image may be estimated as the region suitable for representation.

After the region suitable for presentation is estimated, the management center 14 selects a travel route that passes through the estimated region and transmits the selected travel route to the vehicle 12 (step S16). In this way, the vehicle 12 travels along the transmitted travel route, to thereby present the image in the estimated region.

When a predetermined objective is achieved as a result of performing the above-described process steps (Yes is selected in step S18), operation is terminated. Here, the objective may be defined in terms of a length of time or in terms of a distance. For example, when an accumulated length of displayed time of the image, or a distance traveled by the vehicle 12 under a condition of displaying the image reaches a target value, it may be determined that the objective is achieved. On the other hand, when the objective is not achieved (No is selected in S18), operation returns to step S14, and estimation of a region and subsequent selection and transmission of a travel route are performed again.

In this example, the region suitable for presentation of the image is estimated based on the post-related information, and the travel route of the vehicle 12 is selected so as to pass through the estimated region as described above. In this example, it is naturally considered that the vehicle 12 actively goes to the region where there are a lot of people targeted for advertisement of the image in order to advertise the image. In this way, the effect of advertising the image can be enhanced. Further, in this example, the region suitable for presentation of the image is estimated based on content posted to the SNS sites. Because the content posted to the SNS sites has an excellent real time feature and contains a great deal of personal information of the contributors, present or future situations of people in various regions can be estimated for each of the regions with high accuracy in this example, which can, in turn, ensure that the advertising effect of the image is enhanced.

Figure 11:
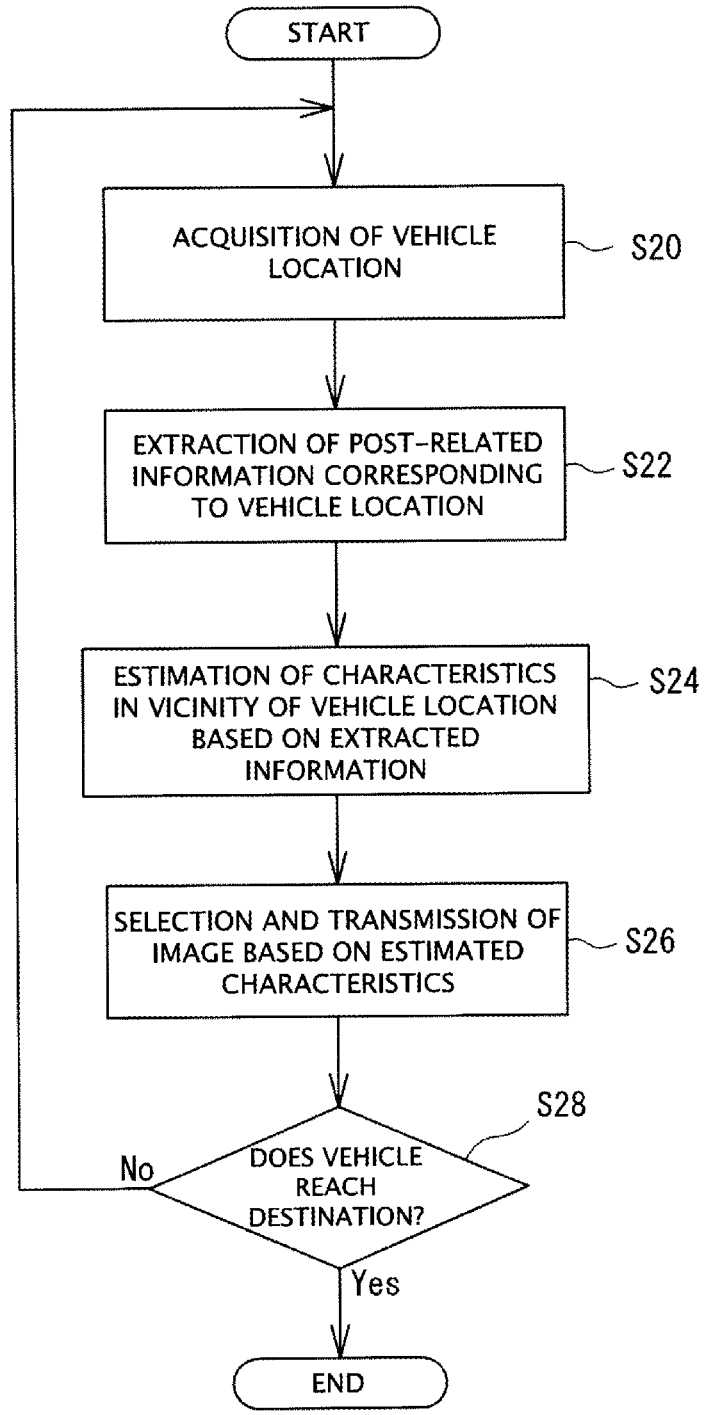
FIG. 11 is a flowchart showing a flow of process steps performed in the second operation form by the on-board signage system.

Next described is a flow of process steps performed in the second operation form by the on-board signage system 10. FIG. 11 is a flowchart showing the flow of the process steps performed in the second operation form by the on-board signage system 10. In the second operation form, the management center 14 cannot be involved in determination of the travel route of the vehicle 12, as described above. Therefore, the management center 14 initially acquires the present or future vehicle location of the vehicle 12 (step S20). Specifically, the management center 14 sends to the vehicle 12 a request to transmit the vehicle location. Upon receipt of the request, the vehicle 12 transmits its present or future vehicle location to the management center 14. Here, the vehicle location to be transmitted may be a present location of the vehicle 12 that is detected by the location sensor. Alternatively, in a case where a navigation system is performing route guidance, the vehicle location to be transmitted may be a travel route that is supplied to the vehicle 12 by the navigation system.

After the vehicle location is acquired, the management center 14 extracts, from the post database 70, post-related information corresponding to the vehicle location (step S22). Then, the management center 14 estimates, based on the extracted post-related information, a trend of people located in the vicinity of the vehicle location or a situation of a region in the vicinity of the vehicle location (step S24). Following this, the management center 14 selects, based on the estimated trend or situation, an image to be assigned to the vehicle 12, and transmits the selected image to the vehicle 12 (step S26). Here, in a case where the image to be assigned to the vehicle 12 is selected from among advertising images, the management center 14 may estimate preferences of people located in the vicinity of the vehicle location based on the post-related information, and select one of the advertising images that match the estimated preferences. Meanwhile, in the event of a disaster, the management center 14 may estimate, based on the post-related information, a disaster situation of a region in the vicinity of the vehicle location or a situation of damage to the people located in the vicinity of the vehicle location, and select the emergency image based on the estimated situation.

After the image is transmitted to the vehicle 12, operation is finished when the vehicle 12 reaches the destination (Yes is selected in step S28). On the other hand, when the vehicle 12 keeps traveling without reaching the destination (No is selected in step S28), the management center 14 returns to step S20, and repeats the above-described process steps in a similar manner.

In this example, the trend or situation in the vicinity of the vehicle location is estimated based on the post-related information, and the image to be assigned to the vehicle 12 is selected based on the estimated trend or situation as described above. When configured as described above, it becomes possible to display suitable images, which can ensure that the advertising effect of the image is enhanced.

The configuration described above is presented merely by way of illustration, and may be changed as appropriate so long as at least one of the travel route of the vehicle 12 and the image to be assigned to the vehicle 12 is selected based at least on the information stored in the post database 70, and transmitted to the vehicle 12.

For example, while in the above example the signage controller 18 is composed of both the vehicle controller 20 installed in the vehicle 12 and the center controller 22 installed in the management center 14, the signage controller 18 may be composed of only one of the vehicle controller 20 and the center controller 22. Therefore, the management center 14 may be optional, and when the management center 14 is not provided, for example, the vehicle 12 may be configured to perform all of the process steps from collecting the post content items to selecting the image or the travel route.

Meanwhile, the form of information stored in the post database 70, the image database 72, and the user database 74 may be changed as appropriate. In this regard, the post database 70 may record, for example, raw data of the post content item without being processed, in place of data obtained by performing text mining on the post content item. Further, the bonus offering unit 64 and the image generating unit 66 may be optional. Still further, the configuration of the vehicle 12 may be appropriately changed, and the vehicle 12 may further include a microphone to output sound/voice for advertising in addition to the display device 16 configured to display the image.

The invention claimed is:

1. An on-board signage system, comprising:
   at least one autonomous vehicle having a vehicle controller;

a display device that is installed in the at least one autonomous vehicle, and configured to display an image which is assigned to the at least one autonomous vehicle on one or more display areas viewable from outside the at least one autonomous vehicle; and a signage controller, wherein the signage controller is configured to function as:
- a post collecting unit configured to collect a post content item posted to an SNS site,
- a post analyzing unit configured to analyze the collected post content item to extract at least a location relating to the post content item as a relevant location,
- a post database that stores post-related information acquired from the post content item in association with the extracted relevant location,
- an image database that stores a plurality of candidate images assignable to the at least one autonomous vehicle, and
- a selector that selects a travel route of the at least one autonomous vehicle and an image to be assigned to the at least one autonomous vehicle based on information stored in the post database, and the signage controller transmits the selected travel route and image to the vehicle controller of the at least one autonomous vehicle; and control the at least one autonomous vehicle to navigate the travel route based on the information transmitted from the signage controller.

2. The on-board signage system according to claim 1, wherein:

the selector comprises a route selecting unit that is configured to estimate, based on information stored in the post database, a region which matches the image assigned to the at least one autonomous vehicle or a region where there are a lot of people who match the image assigned to the at least one autonomous vehicle, and to select the travel route of the at least one autonomous vehicle based on the estimated region.

3. The on-board signage system according to claim 2, wherein the plurality of candidate images include an advertising image; and the selector is configured to estimate, based on information stored in the post database, a region where there are a lot of people whose preferences match the advertising image assigned to the at least one autonomous vehicle, and to select the travel route of the at least one autonomous vehicle based on the estimated region.

4. The on-board signage system according to claim 2, wherein:

the plurality of candidate images include an emergency image for conveying emergency information; and the selector is configured to estimate, based on information stored in the post database, a region where there are a lot of people who need the emergency image assigned to the at least one autonomous vehicle, and to select the travel route of the at least one autonomous vehicle based on the estimated region.

5. The on-board signage system according to claim 1, wherein the selector comprises an image selecting unit configured to estimate, based on the post-related information corresponding to a present or future vehicle location, a trend of people located in a vicinity of the vehicle location or a situation of a region in the vicinity of the vehicle location and to select, based on the estimated trend or situation, an image to be assigned to the at least one autonomous vehicle.

6. The on-board signage system according to claim 5, wherein:

the plurality of candidate images include an advertising image; and the selector is configured to estimate, based on information stored in the post database, preferences of people located in the vicinity of the vehicle location, and to select, based on the estimated preferences, the advertising image to be assigned to the at least one autonomous vehicle.

7. The on-board signage system according to claim 5, wherein:

the plurality of candidate images include an emergency image for conveying emergency information; and the selector is configured to estimate, in the event of a disaster, a disaster situation of a region in the vicinity of the vehicle location or a situation of damage to people located in the vicinity of the vehicle location, and to select, based on the estimated situation, the emergency image to be assigned to the at least one autonomous vehicle.

8. The on-board signage system according to claim 1, wherein the signage controller is configured to also function as an image generating unit that generates, based on the post-related information which is collected in an event of a disaster, an emergency image for conveying emergency information and records the generated emergency image in the image database.

9. The on-board signage system according to claim 1, wherein:

the signage controller is further configured to function as a bonus offering unit that offers a bonus to a registered user;

the post analyzing unit is further configured to analyze the collected post content item and extract a post content item relating to the image displayed on the at least one autonomous vehicle as a responded post content item; and the bonus offering unit is configured to offer the bonus to at least one of a contributor who has posted the responded post content item and an owner of the at least one autonomous vehicle which is displaying the image noted in the responded post content item.

* * * * *